C. R. WOLCOTT.
LAMP FLAME REGULATING BURNER.
APPLICATION FILED SEPT. 5, 1916.
1,214,737.
Patented Feb. 6, 1917.
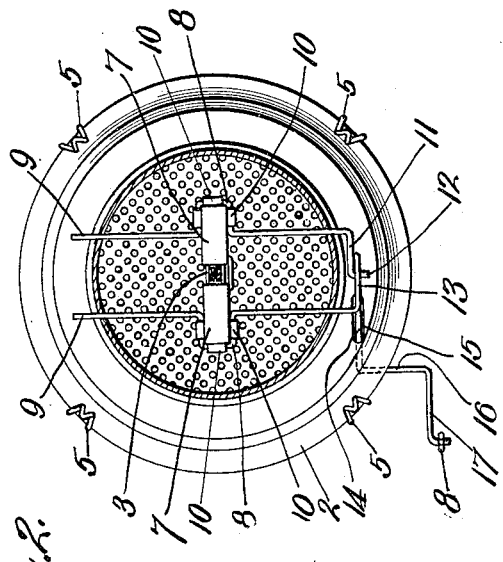
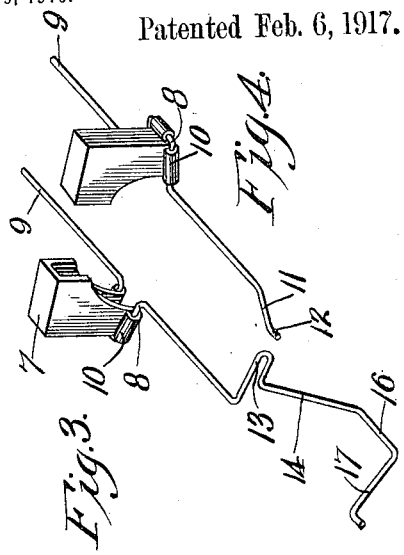
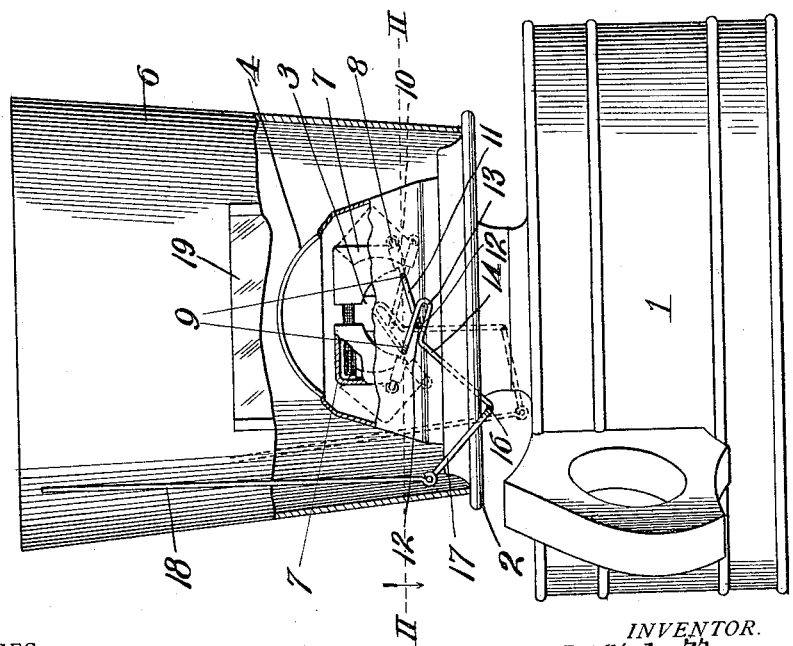
WITNESSES:
INVENTOR.
C. R. Wolcott
BY
ATTORNEY.

UNITED STATES PATENT OFFICE.

CORNELIUS R. WOLCOTT, OF McLOUTH, KANSAS.

LAMP FLAME-REGULATING BURNER.

1,214,737. Specification of Letters Patent. Patented Feb. 6, 1917.

Application filed September 5, 1916. Serial No. 118,473.

*To all whom it may concern:*

Be it known that I, CORNELIUS R. WOLCOTT, a citizen of the United States, residing at McLouth, in the county of Jefferson and State of Kansas, have invented certain new and useful Improvements in Lamp Flame-Regulating Burners, of which the following is a specification.

This invention relates to a lamp flame-regulating burner of that class designed for use with incubators and the like, and the object of the invention is to produce simple and inexpensive means whereby the size of the flame and hence the volume of heat generated can be efficiently controlled.

A further object is to produce a burner of the character mentioned which can be reliably controlled by the use of a thermostat.

Another object is to produce a burner equipped with flame-regulating means which can be so positioned that the use of the lamp for illuminating purposes shall not be interfered with.

With these general objects in view, the invention consists in certain novel and peculiar features of construction and combinations of parts as hereinafter described and claimed; and in order that it may be fully understood reference is to be had to the accompanying drawing, in which:

Figure 1, is an elevation of a lamp embodying my invention, the flue of the lamp being broken away, the upper part of the burner tip being shown in central vertical section, and the flue or chimney holding arms omitted. Fig. 2, is a horizontal section taken on the line II—II of Fig. 1. Fig. 3, is a detail perspective view of one of a pair of flame hoods and the shaft for operating the same. Fig. 4, is a detail perspective view of the other flame hood and the shaft for operating the same.

In the said drawing where like reference characters identify corresponding parts, 1 is the bowl of the lamp, the same being of any suitable or preferred type, 2 is the burner of the lamp, provided with the usual wick tube 3, slotted tip 4 and flue or chimney holding arms 5. The flue or chimney 6 will preferably be of the general form shown when the lamp is used in connection with an incubator. When it is used for illuminating purposes it will be preferable to use a chimney or globe of one of the standard or conventional types.

A pair of similar hoods 7 of substantially right angle triangle shape or contour are fitted in and secured rigidly to central cranks 8 of a pair of parallel shafts 9, which extend through and are journaled near their ends in the burner tip 4 at opposite sides of the wick tube 3, the connections between the hoods and cranks being preferably made by forming the outer walls and the side walls of the hoods at the lower ends of the same with bent back portions or eyes 10 receiving the adjacent portions of said cranks.

One of the crank shafts 9 is provided at one end with an inwardly projecting crank arm 11 having an outturned pin 12. The other crank shaft 9 is provided at the corresponding end with a loop-shaped or slotted crank arm 13 which projects inwardly, and in its loop or slot slidingly receives the said pin 12 of the companion crank shaft. One of the crank shafts, preferably that provided with the loop or slot, is equipped with an arm 14 extending downwardly through a slot 15 in the top of the burner outward of the burner tip, and extending outward from the lower end of the arm 14 is a horizontal arm 16, said arm projecting outward beyond the vertical plane of the periphery of the burner, and being equipped at its outer end with an upwardly and laterally projecting crank 17 pivotally attached to the lower end of a rod 18 for actuation upwardly and downwardly by means of a thermostat, not shown.

The cranks 7 and the flame hoods 6 fit over or around the outer portions of the wick tube. Normally the operative parts referred to occupy the positions shown by dotted lines Fig. 1, the hoods thus leaving the upper end of the wick unobstructed so that the full benefit from the flame when the lamp is burning may be obtained either for heat-producing or illuminating purposes, as may be observed through an ordinary globe or chimney, or through a window 19 provided in a flue of the type illustrated, which flue is preferably of sheet metal and consequently would, lacking a window, hide the flame from view.

Assuming that the hoods are in the position shown by dotted lines, Fig. 1, and that heat generated by flame rising from the wick, rises above the temperature at which it is desired to maintain the incubator or the like (not shown), the thermostat operates to swing crank arm 17 clockwise. This action through the pin and slot connection between the two shafts 9, effects counterclockwise rotation of crank arm 11, the two hoods swinging upwardly over the wick and by gradually covering the same, cutting down or narrowing the flame rising from the wick. When the crank arm 17 has been swung its full distance, that is from the position shown by dotted lines to the position shown by full lines, Fig. 1, the hoods cover the entire wick except a narrow portion at its center, it being desirable that the hood shall be so proportioned as to never completely cover the wick and thereby effect the extinguishment of the flame. It will also be noticed by reference to Fig. 1, that when the hoods are fully raised they embrace the wick tubes so snugly that it is impossible for flame from the wick to flash back and burn at the lower ends of the hoods and thus avoid danger of an explosion or the generating of heat when the same is not desired. When the temperature falls below the predetermined degree desired, the thermostat reacts to effect the relowering of the flame hoods and the consequent exposure of a larger area of the wick and an increase in the volume of heat generated.

The operative parts are so proportioned and arranged that they will respond readily to expansion and contraction of the thermostat, and it will also be apparent that when the crank handle 17 is disengaged from the rod 18, the burner tip can be readily removed together with the hoods and shafts carried thereby, simple manipulation of the burner tip being required to slide the parts 14, 16 and 17 up through the slot 15 in the top of the burner 2.

From the above description it will be apparent that I have produced a lamp flame-regulating burner embodying the features of advantage enumerated as desirable in the statement of the object of the invention, and while I have illustrated the preferred embodiment of the invention, I reserve the right to make such changes as properly fall within the spirit and scope of the appended claims.

I claim:

1. The combination with a lamp burner, having a wick tube, a wick, and a burner tip inclosing the upper end of the wick tube and wick and having a slot vertically above the same, of a pair of parallel shafts journaled in the burner tip at opposite sides of the wick tube and provided within the latter with outwardly projecting cranks, and exterior to said tip with inwardly projecting cranks having a slidable interlocked relation whereby either shaft may transmit power to the other shaft, a pair of flame hoods respectively secured to the outwardly projecting cranks of said shafts and adapted to respectively cover and uncover the upper corners of the wick tube and the upper end of the wick, and a crank arm forming an extension of one of the inwardly projecting cranks and disposed exteriorly of the burner, and adapted when operated to rock the shafts and transmit power to the hoods thereof.

2. The combination with a lamp burner, having a wick tube and wick, of a pair of shafts suitably journaled and provided with crank arms slidingly interlocked to transmit power from one to the other, a pair of flame hoods mounted on said shafts and adapted when swung inwardly by said shafts to cover the wick outward of its center, and when swung in the opposite directions to uncover the wick; one of said crank arms having an arm extending downward through the underlying part of the burner and the last-named arm an arm projecting outwardly beyond the plane of the periphery of the burner and terminating at its outer end in a crank, and a rod connected to swing said last-named crank upwardly or downwardly to effect covering or uncovering movements of said hoods.

3. The combination with a lamp burner, having a wick tube and a wick therein and also having a burner tip and a slot exterior to said burner tip, of a pair of parallel shafts extending across the burner tip and journaled therein at opposite sides of the wick tube, and provided centrally with cranks fitting around the outer edges of the wick tube, and provided also with inwardly projecting cranks externally of the burner tip, one of said cranks being slotted and the other provided with an outwardly projecting pin engaging the slotted crank, and one of said last-named cranks having an arm extending down through and adapted to swing in said slot of the burner, means for swinging said arm and thereby reversely rotating said shafts simultaneously, and flame hoods secured to the said central cranks of said shafts and adapted under corresponding movements of the latter, to swing inwardly over the wick and wick tube or outwardly to uncover the wick and wick tube.

4. The combination with a lamp burner, having a wick and wick tube, a burner tip and a slot exterior to said burner tip, of a pair of parallel shafts extending through and journaled in the burner tip at opposite sides of the wick tube, and provided with outwardly projecting cranks through which the wick tube extends; said shafts at corresponding ends being provided with inwardly projecting cranks having a pin and slot connection, the slotted crank having an arm extending downward through the said slot of the burner, an arm projecting outwardly from the lower end of the downwardly extending arm and a crank extending upwardly and laterally from the outer end of the last-named arm, means connected to said crank to swing the same and thereby rock said shafts simultaneously in opposite directions, and substantially triangular flame hoods rigidly secured to the first-named cranks of said shaft and adapted to be swung by the latter to cover or uncover the wick.

In testimony whereof, I affix my signature, in the presence of two witnesses.

CORNELIUS R. WOLCOTT.

Witnesses:
 K. M. THORPE,
 G. Y. THORPE.

Copies of this patent may be obtained for five cents each, by addressing the "Commissioner of Patents, Washington, D. C."